United States Patent
Petrosky

(10) Patent No.: US 9,726,050 B2
(45) Date of Patent: Aug. 8, 2017

(54) VERSATILE PINCH POINT AVOIDANCE RECUPERATOR FOR SUPERCRITICAL CARBON DIOXIDE POWER GENERATION SYSTEMS

(71) Applicant: Westinghouse Electric Company LLC, Cranberry Township, PA (US)

(72) Inventor: Lyman J. Petrosky, Latrobe, PA (US)

(73) Assignee: Westinghouse Electric Company LLC, Cranberry Township, PA (US)

(*) Notice: Subject to any disclaimer, the term of this patent is extended or adjusted under 35 U.S.C. 154(b) by 60 days.

(21) Appl. No.: 15/052,005

(22) Filed: Feb. 24, 2016

(65) Prior Publication Data

US 2016/0281545 A1    Sep. 29, 2016

Related U.S. Application Data

(60) Provisional application No. 62/137,848, filed on Mar. 25, 2015.

(51) Int. Cl.

| | |
|---|---|
| F01K 3/12 | (2006.01) |
| F01K 25/10 | (2006.01) |
| F01K 3/18 | (2006.01) |
| F01K 7/16 | (2006.01) |
| F02C 1/10 | (2006.01) |
| F01K 3/00 | (2006.01) |
| F02C 9/24 | (2006.01) |

(Continued)

(52) U.S. Cl.
CPC .......... *F01K 25/103* (2013.01); *F01K 3/12* (2013.01); *F01K 3/18* (2013.01); *F01K 7/16* (2013.01); *F01K 3/004* (2013.01); *F01K 3/006* (2013.01); *F01K 7/32* (2013.01); *F02C 1/105* (2013.01); *F02C 9/18* (2013.01); *F02C 9/24* (2013.01); *Y02E 60/14* (2013.01); *Y10S 165/038* (2013.01); *Y10S 165/042* (2013.01)

(58) Field of Classification Search
CPC . F01K 3/004; F01K 3/006; F01K 3/12; F01K 3/181; F01K 7/16; F01K 7/32; F01K 23/10; F01K 25/103; F02C 1/105; F02C 9/18; F02C 9/24; Y02E 60/14; Y10S 165/038; Y10S 165/042
USPC .......... 60/647, 650, 659, 682, 684; 165/236, 165/902, FOR. 109, DIG. 37, DIG. 42, 165/DIG. 539

See application file for complete search history.

(56) References Cited

U.S. PATENT DOCUMENTS

| | | |
|---|---|---|
| 5,896,738 A | 4/1999 | Yang et al. |
| 6,490,866 B1 | 12/2002 | Cummings |
| 9,394,807 B1 * | 7/2016 | Kreuger .............. F01K 1/12 |

(Continued)

OTHER PUBLICATIONS

International Search Report and Written Opinion of the International Searching Authority for PCT/US2016/019275 dated May 25, 2016 (Forms PCT/ISA/220, PCT/ISA/210, PCT/ISA/237).

*Primary Examiner* — Jorge Leon, Jr.
(74) *Attorney, Agent, or Firm* — Eckert Seamans Cherin & Mellott, LLC; Daniels C. Abeles

(57) ABSTRACT

A supercritical carbon dioxide power generation Brayton cycle system and method that employs an alternate heat recuperation method and apparatus that utilizes switched banks of bead filled tanks to accumulate and recover the thermal energy of the two streams of working fluid in such a way that the variable thermal properties of the supercritical carbon dioxide can be accommodated without significant loss of thermal efficiency.

9 Claims, 1 Drawing Sheet

(51) Int. Cl.
*F01K 7/32* (2006.01)
*F02C 9/18* (2006.01)

(56) References Cited

U.S. PATENT DOCUMENTS

2014/0020369 A1   1/2014   Guidati
2014/0084595 A1   3/2014   Davidson et al.
2014/0298813 A1   10/2014  Brunhuber et al.

* cited by examiner

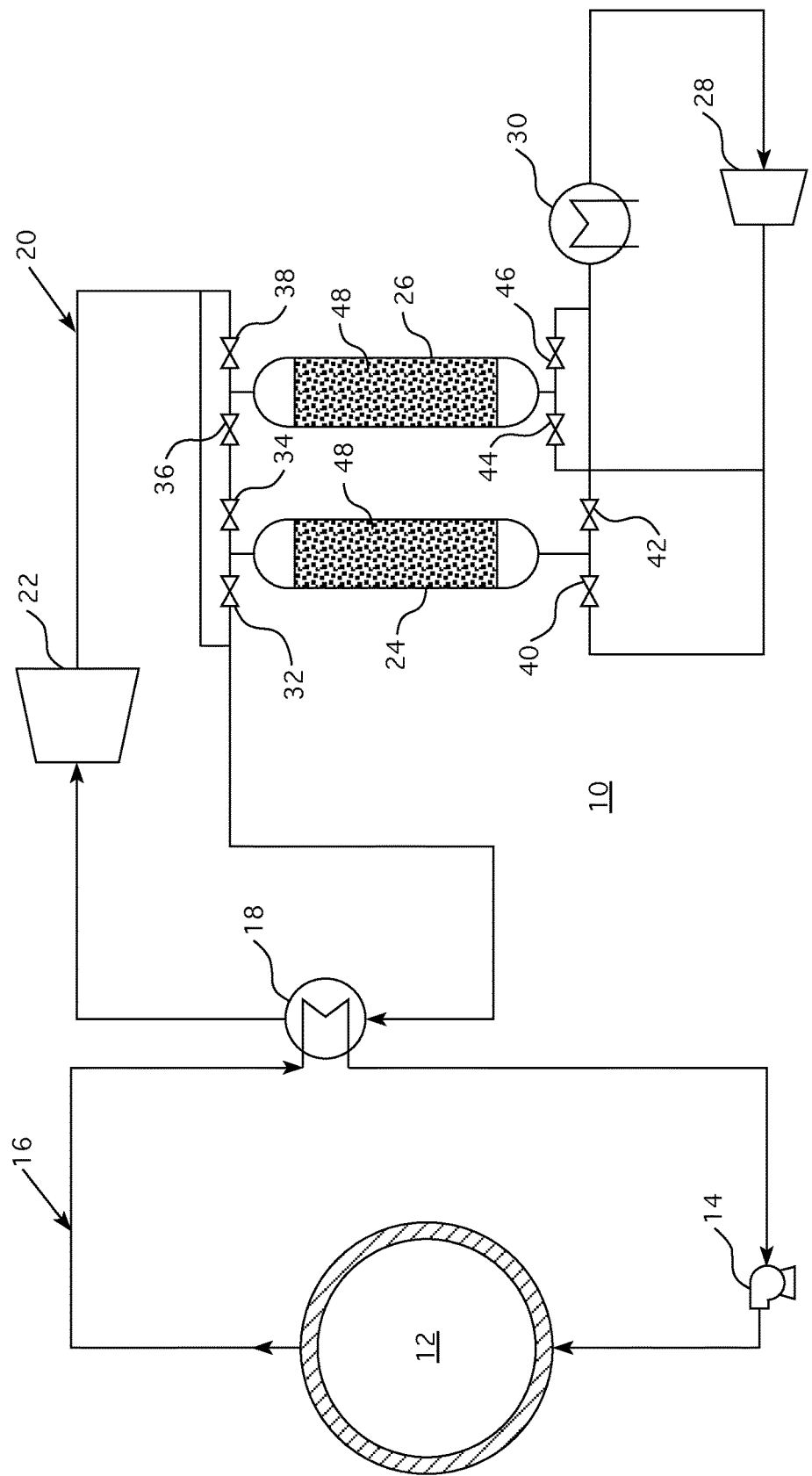

VERSATILE PINCH POINT AVOIDANCE RECUPERATOR FOR SUPERCRITICAL CARBON DIOXIDE POWER GENERATION SYSTEMS

CROSS REFERENCE TO RELATED APPLICATION

This application is claims priority to U.S. Provisional Patent Application Ser. No. 62/137,848, filed Mar. 25, 2015, entitled VERSATILE PINCH POINT AVOIDANCE RECUPERATOR FOR SUPERCRITICAL CARBON DIOXIDE POWER GENERATION SYSTEMS.

BACKGROUND

1. Field

This invention relates in general to power generation systems employing a Brayton cycle, and more particularly to using supercritical carbon dioxide ($sCO_2$) as a working fluid.

2. Related Art

Power generation using the Brayton cycle with supercritical $CO_2$ as the working fluid is currently being explored. Supercritical carbon dioxide is a fluid state of carbon dioxide where it is held at or above its critical temperature and critical pressure. Carbon dioxide usually behaves as a gas in air at standard temperature and pressure, or as a solid called dry ice when frozen. If the temperature and pressure are both increased from the standard temperature and pressure to be at or above the critical point for carbon dioxide, it can adopt properties midway between a gas and a liquid. More specifically, supercritical carbon dioxide behaves as a supercritical fluid above its critical temperature (304.25 K) and critical pressure (72.9 atm or 7.39 MPa), expanding to fill its container like a gas, but with a density like that of a liquid.

The Brayton cycle is a thermodynamic cycle using constant pressure, heat addition and rejection. Fuel and a compressor are used to heat and increase the pressure of a gas, i.e., the working fluid; the gas expands and spins the blades of a turbine, which, when connected to a generator, generates electricity. Power generation using a supercritical $CO_2$ Brayton cycle system requires a recuperator to transfer heat from a lower pressure stream into the high pressure stream. Typically a recuperator is a special purpose counterflow energy recovery heat exchanger positioned within the supply or exhaust air streams of a gas handling system, or in the exhaust gases of an industrial process, in order to recover the waste heat. Simple recuperation in the form of a counterflow heat exchanger cannot perform this function efficiently in a Brayton cycled application using $sCO_2$, because of the variable thermal properties of $sCO_2$ in the two streams, i.e., the stream returning from the turbine to the compressor and the stream returning from the compressor to the heat source. The heat capacity off of the two streams varies with temperature in such a way that a mismatch exists that creates a large temperature difference in the recuperator. This causes a loss of thermal efficiency. Various remedies exist to split the cold stream flow, using multiple recuperators and multiple compressors, but these all increase the system complexity and suffer some loss in thermal efficiency.

BRIEF DESCRIPTION OF THE DRAWINGS

A further understanding of the invention can be gained from the following description of the preferred embodiments when read in conjunction with the accompanying drawing in which:

FIG. 1 is a schematic view of one embodiment of a Brayton power generation cycle employing $sCO2$ as the working fluid and one embodiment of this invention for the recuperator.

DESCRIPTION OF THE PREFERRED EMBODIMENT

This invention provides an alternate heat recuperation method and apparatus that utilizes switched banks of bead filled tanks to accumulate and recover the thermal energy of the two streams of working fluid in such a way that the variable thermal properties of the $sCO_2$ can be accommodated without significant loss of thermal efficiency. One preferred embodiment is illustrated in FIG. 1, which schematically shows a Brayton cycle 10 that employs supercritical $CO_2$ as a working fluid. A heat source 12, such as a nuclear reactor, heats a heat transfer fluid, such as liquid sodium, which is pumped by pump 14 through a closed loop 16 that extends through a conventional heat exchanger 18 that is in heat exchange relationship with a working fluid, i.e., $sCO_2$, that is circulated through a second closed loop 20. The heated working fluid is routed to a turbine 22 and spins the turbine to create useful work. The working fluid is then conveyed from the turbine 22 through one or the other of the tanks 24, 26 to a lower portion of the closed loop 20 through heat sink 30 and compressor 28. The heat sink lowers the temperature of the working fluid before the working fluid enters the compressor. The heat exchanger 30 provides the closed Brayton cycle low side heat rejection to a heat sink, e.g., the atmosphere. The working fluid exits the compressor 28 and is driven through the other of the tanks 24, 26 back to the heat exchanger 18 to complete the circuit.

In the exemplary embodiment illustrated in FIG. 1, heat transfer fluid exiting the heat source 12 in the heat transfer loop 16 is at a temperature of approximately 1036 degrees Fahrenheit (831° K) and a pressure of about 145 psia (1 MPa) and is conveyed through the primary side of the heat exchanger 18. The heat transfer fluid exits the primary side of the heat exchanger 18 at a temperature of approximately 932 degrees Fahrenheit (773° K) and a pressure of 145 psia (1 MPa) and is returned to the heat source 12 by the circulating pump 14. The working fluid exits the secondary side of the heat exchanger 18 at a temperature of approximately 1022 degrees Fahrenheit (823° K) and a pressure of approximately 2900 psia (20 MPa) and enters the turbine 22 in which the temperature is reduced to approximately 815 degrees Fahrenheit (708° K) and the pressure is reduced to approximately 1115 psia (8 MPa). After traversing one or the other of the tanks 24, 26 to the inlet of the heat sink the working fluid temperature is further reduced to approximately 212 degrees Fahrenheit (373° K) and the pressure is maintained at 1115 psia (8 MPa). After traversing the heat sink 30 the temperature is further reduced to approximately 90 degrees Fahrenheit (305° K) and the pressure is maintained at approximately 1115 psia (8 MPa). After traversing the compressor 28 and the other of the tanks 24, 26, the working fluid is returned to the secondary side of the heat exchanger 18 at a temperature of approximately 750 degrees Fahrenheit (672° K) and a pressure of approximately 2900 psia (20 MPa). The foregoing presumed a mass flow of the heat transfer fluid through the heat transfer loop 16 of approximately 5000 lb./s (2268 Kg/s) and a mass flow of the working fluid upstream of the tanks and between the compressor and the heat exchanger 18 of approximately 5290 lb./s (2400 Kg/s) and between the tanks and the compressor inlet of approximately 5290 lbs/s (2400 Kg/s). These values are only exemplary and may vary without departing from the scope of the claims set forth hereafter.

The preferred embodiment employs multiple and preferably elongated tanks, i.e., two or more, filled with a thermal storage medium 48, which can take the form of sand, beads, or any other porous medium with a high surface area and heat capacity, such as a ceramic material. The solid filler material 48 with high surface area will absorb, retain and transmit heat from and to the working fluid. Preferably each tank uses the same filler material. The tanks are piped together with valves 32, 34, 36, 38, 40, 42, 44 and 46 such that each tank can be individually connected to either the stream exiting the compressor 28 to be heated or the stream exiting the turbine to be cooled. A stream to be cooled would be directed to one of the tanks 24 or 26 containing mostly cold filler material while, simultaneously, the stream to be heated would be directed to the other of the tanks 24, 26 containing mostly hot material. The streams will progressively transfer thermal energy to or from the tank's filler material. Before the tank filler material reaches thermal equilibrium and just before the tank's exhaust temperature begins to change significantly, the original flow stream is cut off and the opposite stream is directed to that tank with the input in the opposite direction of flow than that had previously flowed through that tank. The same is done for the other tank. The thermal energy stored by the first stream is then transferred from the filler material into the second stream. Periodically, as each tank's contents reaches it thermal storage capacity the flow is switched, alternating between the two flow streams as needed for optimal performance. Of course, more than two tanks may be employed with approximately one-half of the tanks connected to each stream at any given moment in time. Alternately, an odd number of tanks may also be employed with the streams rotated among the tanks. The heat exchanger 30 is a heat sink for drawing heat from the working fluid before it enters the compressor 28. In another embodiment using a non-nuclear heat source, thermal transfer fluid loop 16 may be deleted entirely and the heat source, for example a natural gas flame, can be routed directly through heat exchanger 18 to provide thermal energy to the $CO_2$ Brayton cycle.

Accordingly, this invention uses an intermediate heat storage medium to alleviate the problems associated with heat exchanger pinch point, i.e., the point at which the temperature difference is minimal. The invention uses alternating stream flow directions to maintain a steep thermal gradient in the thermal storage medium and uses switched banks of tanks to provide pseudo-continuous operation. The heat exchanger construction employed is very inexpensive, compact, and resistant to plugging, as compared to conventional solutions. Supercritical $CO_2$ is a very promising power cycle, but the thermal properties of the working fluid, i.e., the heat capacity and heat transfer, in the low temperature side of the Brayton cycle have impeded adoption of this design. This invention offers a simple and inexpensive solution to these problems.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. A supercritical carbon dioxide power generation Brayton cycle system comprising:
   a heat source for heating a working fluid;
   a turbine in fluid communication with the working fluid exiting the heat source and having an inlet for the working fluid exiting the heat source and an outlet for the working fluid exiting the turbine;
   a compressor in fluid communication with the outlet of the turbine having an inlet for the working fluid exiting the turbine and an outlet in fluid communication with the heat source for communicating the working fluid back to the heat source;
   a versatile pinch point avoidance recuperator comprising a plurality of tanks each housing beads constructed of a solid filler material that absorbs, retains and transmits heat, with the plurality of tanks connected in parallel between the compressor and the turbine with a valving arrangement that connects an inlet of a first group of tanks, the first group of tanks comprising at least one tank of the plurality of tanks, to the outlet of the turbine and an outlet of the first group of tanks to the inlet of the compressor and connects an outlet of a second group of tanks, the second group of tanks comprising at least one other tank of the plurality of tanks, to an inlet of the heat source and an inlet of the second group of tanks to the outlet of the compressor so that a first flow through the first group of tanks is in counter-flow relationship with a second flow through the second group of tanks with the valving arrangement operable to alternately reverse the first flow and the second flow while maintaining the counter-flow relationship between the first group of tanks and the second group of tanks; and
   a heat sink in fluid communication with the first group of tanks or the second group of tanks such that the working fluid passes through the heat sink before entering the compressor.

2. The supercritical carbon dioxide power generation Brayton cycle system of claim 1 wherein the solid filler material comprises sand.

3. The supercritical carbon dioxide power generation Brayton cycle system of claim 1 wherein the solid filler material comprises a ceramic.

4. The supercritical carbon dioxide power generation Brayton cycle system of claim 1 wherein the compressor compresses the working fluid to a pressure equal to or greater than 72.9 atm or 7.39 MPa.

5. The supercritical carbon dioxide power generation Brayton cycle system of claim 1 wherein the heat source heats the working fluid to a temperature equal to or greater than 304.25 K.

6. The supercritical carbon dioxide power generation Brayton cycle system of claim 1 wherein the heat sink reduces the temperature of the working fluid entering the compressor.

7. A method of employing supercritical carbon dioxide as a working fluid in a power generation Brayton cycle system comprising: a heat source for heating a working fluid; a turbine in fluid communication with the working fluid exiting the heat source and having an inlet for the working fluid exiting the heat source and an outlet for the working fluid exiting the turbine; a compressor in fluid communication with the outlet of the turbine having an inlet for the working fluid exiting the turbine and an outlet in fluid communication with the heat source for communicating the working fluid back to the heat source; a versatile pinch point avoidance recuperator comprising a plurality of tanks each housing beads constructed of a solid filler material that absorbs, retains and transmits heat, with the plurality of tanks connected in parallel between the compressor and the turbine with a valving arrangement that connects an inlet of a first group of tanks, the first group of tanks comprising at least one tank of the plurality of tanks, to the outlet of the turbine and an outlet of the first group of tanks to the inlet of the compressor and connects an outlet of a second group of tanks, the second group of tanks comprising at least one other tank of the plurality of tanks, to an inlet of the heat source and an inlet of the second group of tanks to the outlet of the compressor so that a first flow through the first group of tanks is in counter-flow relationship with a second flow through the second group of tanks with the valving arrangement operable to alternately reverse the first flow and the second flow while maintaining the counter-flow relationship between the first group of tanks and the second group of tanks; and a heat sink in fluid communication with the first group of tanks or the second group of tanks such that the working fluid is cooled in the heat sink before the working fluid enters the inlet of the compressor;

the method comprising:

heating the working fluid with the heat source;

passing the working fluid through the inlet of the turbine;

expanding the working fluid through the turbine;

conveying the working fluid exiting the outlet of the turbine to the inlet of the first group of tanks of the versatile pinch point avoidance recuperator;

routing the working fluid exiting the outlet of the first group of tanks of the versatile pinch point avoidance recuperator through the heat sink to the inlet of the compressor;

compressing the working fluid in the compressor;

directing the working fluid exiting the outlet of the compressor to the inlet of the second group of tanks of the versatile pinch point avoidance recuperator; and returning the working fluid exiting the outlet of the second group of tanks of the versatile pinch point avoidance recuperator to the heat source.

8. The method of claim 7 including the step of reconfiguring the valving arrangement after a preselected period of time, wherein the counter-flow relationship of the first flow through the first group of tanks and the second flow through the second group of tanks is reversed after the preselected period of time.

9. The method of claim 8 wherein the preselected period of time is before the solid filler material of the plurality of tanks reaches thermal equilibrium with the working fluid passing through the plurality of tanks.

* * * * *